United States Patent
Nemitz et al.

(10) Patent No.: US 9,836,770 B2
(45) Date of Patent: Dec. 5, 2017

(54) DATA CAPTURE FOR USER INTERACTION WITH PROMOTIONAL MATERIALS

(75) Inventors: George M. Nemitz, Pennington, NJ (US); Vincent James Spinella, Colts Neck, NJ (US); Rajiv Konkimalla, Edison, NJ (US); Dillip Kumar Kara, Monmouth Junction, NJ (US); James Francis Spinella, Colts Neck, NJ (US)

(73) Assignee: Ad Persistence, LLC, Colts Neck, NJ (US)

( * ) Notice: Subject to any disclaimer, the term of this patent is extended or adjusted under 35 U.S.C. 154(b) by 12 days.

(21) Appl. No.: 13/404,873

(22) Filed: Feb. 24, 2012

(65) Prior Publication Data

US 2013/0226689 A1    Aug. 29, 2013

(51) Int. Cl.
G06Q 30/00    (2012.01)
G06Q 30/02    (2012.01)

(52) U.S. Cl.
CPC ..... *G06Q 30/0277* (2013.01); *G06Q 30/0241* (2013.01); *G06Q 30/0242* (2013.01); *G06Q 30/0251* (2013.01); *G06Q 30/0257* (2013.01)

(58) Field of Classification Search
USPC ........................ 705/14.41, 14.4, 14.55, 14.49
See application file for complete search history.

(56) References Cited

U.S. PATENT DOCUMENTS

| | | |
|---|---|---|
| 5,809,497 A | 9/1998 | Freund et al. |
| 5,812,793 A | 9/1998 | Shakib et al. |
| 5,835,087 A | 11/1998 | Herz et al. |
| 6,216,129 B1 | 4/2001 | Eldering |
| 6,259,405 B1 | 7/2001 | Stewart et al. |
| 6,421,717 B1 | 7/2002 | Kloba et al. |
| 6,647,257 B2 | 11/2003 | Owensby |
| 6,647,269 B2 | 11/2003 | Hendrey et al. |
| 6,671,757 B1 | 12/2003 | Multer et al. |
| 6,826,614 B1 * | 11/2004 | Hanmann et al. ............ 709/227 |
| 7,263,551 B2 | 8/2007 | Belfiore et al. |
| 7,401,104 B2 | 7/2008 | Shah et al. |
| 7,761,414 B2 | 7/2010 | Freedman |
| 8,321,534 B1 | 11/2012 | Roskind et al. |
| 2002/0116271 A1 * | 8/2002 | Mankoff .......................... 705/14 |
| 2002/0160761 A1 * | 10/2002 | Wolfe ............................ 455/414 |

(Continued)

FOREIGN PATENT DOCUMENTS

| | | |
|---|---|---|
| JP | 2003125379 | 4/2003 |
| JP | 2010504044 | 2/2010 |

(Continued)

OTHER PUBLICATIONS http://www.webopedia.com/TERM/G/gateway.html.*

(Continued)

*Primary Examiner* — Luis A Brown
(74) *Attorney, Agent, or Firm* — Lowenstein Sandler LLP

(57) ABSTRACT

An application on a user device sends a request for promotional material to a server while the application is active on a user device. The application receives the promotional material from the server and stores the promotional material in a data store on the user device. A management client on the user device receives a user interaction with the promotional material and sends data representing the user interaction to the server independent of web-browser technology.

20 Claims, 8 Drawing Sheets

(56) References Cited

U.S. PATENT DOCUMENTS

| | | |
|---|---|---|
| 2003/0018521 A1 | 1/2003 | Kraft et al. |
| 2003/0045301 A1 | 3/2003 | Wollrab |
| 2003/0045311 A1 | 3/2003 | Larikka et al. |
| 2003/0104833 A1 | 6/2003 | Chiu |
| 2004/0054800 A1 | 3/2004 | Shah et al. |
| 2004/0210477 A1 | 10/2004 | McIntyre |
| 2005/0216556 A1 | 9/2005 | Manion et al. |
| 2006/0036495 A1 | 2/2006 | Aufricht et al. |
| 2006/0190330 A1 | 8/2006 | Tollinger et al. |
| 2006/0190331 A1 | 8/2006 | Tollinger et al. |
| 2006/0215569 A1 | 9/2006 | Khosravy et al. |
| 2007/0016362 A1 | 1/2007 | Nelson |
| 2007/0038516 A1 | 2/2007 | Apple et al. |
| 2007/0157229 A1 | 7/2007 | Heathchock |
| 2007/0162341 A1* | 7/2007 | McConnell et al. ............ 705/14 |
| 2007/0174490 A1* | 7/2007 | Choi et al. .................... 709/246 |
| 2007/0198339 A1 | 8/2007 | Shen et al. |
| 2007/0244750 A1 | 10/2007 | Grannan et al. |
| 2007/0294292 A1 | 12/2007 | Hydrie et al. |
| 2008/0004954 A1 | 1/2008 | Horvitz |
| 2008/0004957 A1 | 1/2008 | Hildreth et al. |
| 2008/0005168 A1 | 1/2008 | Huff et al. |
| 2008/0046944 A1 | 2/2008 | Lee et al. |
| 2008/0083003 A1 | 4/2008 | Biniak et al. |
| 2008/0098420 A1* | 4/2008 | Khivesara et al. ............ 725/32 |
| 2008/0140529 A1 | 6/2008 | Agarwal et al. |
| 2008/0152097 A1 | 6/2008 | Kent |
| 2008/0176536 A1 | 7/2008 | Galluzzo et al. |
| 2008/0195462 A1 | 8/2008 | Magdon-Ismail |
| 2008/0201731 A1 | 8/2008 | Howcroft |
| 2008/0242277 A1 | 10/2008 | Chen et al. |
| 2009/0030787 A1 | 1/2009 | Pon et al. |
| 2009/0076912 A1* | 3/2009 | Rajan et al. .................... 705/14 |
| 2009/0197582 A1 | 8/2009 | Lewis |
| 2009/0265236 A1 | 10/2009 | Schultz et al. |
| 2009/0282458 A1 | 11/2009 | Hjelm |
| 2009/0318168 A1 | 12/2009 | Khosravy et al. |
| 2010/0088234 A1 | 4/2010 | Moore |
| 2010/0217655 A1* | 8/2010 | Kuehnel et al. ............ 705/14.4 |
| 2010/0262500 A1 | 10/2010 | Yu |
| 2010/0287035 A1* | 11/2010 | Nemitz et al. .................. 705/10 |
| 2010/0287580 A1 | 11/2010 | Harding et al. |
| 2011/0078602 A1 | 3/2011 | Gammon |
| 2011/0112905 A1 | 5/2011 | Pulijala |
| 2011/0112906 A1 | 5/2011 | Pulijala |
| 2011/0125594 A1 | 5/2011 | Brown et al. |
| 2011/0153426 A1* | 6/2011 | Reddy et al. ............... 705/14.58 |
| 2011/0307323 A1* | 12/2011 | Kuhn et al. ................ 705/14.42 |
| 2011/0321167 A1 | 12/2011 | Wu et al. |
| 2012/0233651 A1* | 9/2012 | Lee et al. ...................... 725/110 |

FOREIGN PATENT DOCUMENTS

| | | |
|---|---|---|
| JP | 2010509618 | 3/2010 |
| WO | 03/005262 | 1/2003 |
| WO | WO03073292 | 9/2003 |

OTHER PUBLICATIONS http://www.thefreedictionary.com/Protocol+(network).*

International Search Report for PCT/US10/33874 filed May 6, 2010, dated Jun. 20, 2010.

International Search Report and Written Opinion for PCT/US13/27420, filed Feb. 22, 2013, dated May 2, 2013.

McGlaun, Shane; "Location Aware Application to Surge in 2009", DailyTech, Jan. 19, 2009.

U.S.; Office Action for U.S. Appl. No. 12/463,131, dated Sep. 14, 2011.

U.S.; Office Action for U.S. Appl. No. 12/463,131, dated Mar. 7, 2012.

U.S.; Office Action for U.S. Appl. No. 12/463,131, dated Sep. 18, 2012.

European Search Report for EPC Patent Application No. 13751440.2 dated Mar. 12, 2015.

European Search Report for EPC Patent Application No. 10772829 dated Mar. 26, 2013.

U.S.; Office Action for U.S. Appl. No. 12/463,131, dated May 20, 2014.

U.S.; Office Action for U.S. Appl. No. 12/463,131, dated Aug. 6, 2014.

U.S.; Office Action for U.S. Appl. No. 12/463,131, dated Apr. 29, 2015.

Notification of Reasons for Refusal for Japanese Application No. 2014-558889, dated Oct. 27, 2016, 9 pages.

* cited by examiner

DATA CAPTURE FOR USER INTERACTION WITH PROMOTIONAL MATERIALS

TECHNICAL FIELD

This invention relates to the distribution of promotional material and, in particular, to data capture for user interaction with promotional materials.

BACKGROUND

Online advertising is a form of promotion that delivers marketing messages to users over the Internet to attract customers. Examples of online advertising include contextual ads on search engine results pages, banner ads, blogs, rich media ads, social network advertising, interstitial ads, online classified advertising, advertising networks and e-mail marketing, including e-mail spam. Many of these types of ads are delivered by an ad server.

Online advertising has grown recently with the advancement of mobile technologies such as smartphones and tablets. The catalyst that drives the popularity of smartphones and tablets is the downloadable network centric applications (also referred to as "apps"). Banner ads have become the most common form of conventional smartphone app advertisements. When these ads are clicked by a user, the banner ad itself has a hyperlink uniform resource locater (URL) to a website where the user can find more information on the advertisement promotion.

Banner advertisements are driven by a number of impressions, where an advertisement is displayed in a pictorial or text format on either a webpage or within a mobile app. Banner ad pricing models are mainly based on how many impressions an advertisement campaign will include, thus creating the advertisement terms CPM (Cost Per Mille) and CPT (Cost Per Thousand Impressions). With the use of banner ads, user interaction is typically known as a "click." When a banner ad is clicked, the URL based promotion will invoke a web page in a separate web browser program to deliver additional information of what is being promoted by the banner ad. This may interrupt the progress of the application, by closing the application and/or opening the web browser. Many users may find this interruption annoying and intrusive.

Measurement of how well users respond to a banner ad campaign includes the ratio of a number of clicks to a number of impressions displayed either by an Internet browser or a mobile smartphone. Since digital advertisements are centered on Internet browser technology, tracking user clicks is typically provided by, or bounded to, browser-based cookies or specialized tracking code that has been embedded in a web page. This tracking method is severely limited in terms of the amount of data that can be collected as well as the types of data that are collected. Thus, evaluating the effectiveness of conventional on-line advertising campaigns can be difficult.

SUMMARY

The following is a simplified summary of the invention in order to provide a basic understanding of some aspects of the invention. This summary is not an extensive overview of the invention. It is intended to neither identify key or critical elements of the invention, nor delineate any scope of the particular implementations of the invention or any scope of the claims. Its sole purpose is to present some concepts of the invention in a simplified form as a prelude to the more detailed description that is presented later.

In one embodiment, a management client on a user device sends a request for promotional material to a server while an application is active on a user device. In another embodiment, the application sends the request for promotional material directly to the server. The management client may be separate from the application and may be configured to manage a plurality of promotional materials received from the server and to provide access to the promotional materials without interrupting a function of the application. The promotional material may include at least one of an advertisement, brochure, coupon, multimedia message, loyalty card program, and rebate offering. The management client or application may receive the promotional material from the server and store the promotional material in a data store on the user device. In response to receiving the promotional material, the application or management client may display, in the application, an indication that the promotional material was received.

The management client may present an interface to a user and may receive a user interaction with the promotional material. The user interaction may include at least one of viewing, saving, sharing, deleting, purchasing and redeeming the promotional material and/or some other form of interaction. The management client may send data representing the user interaction to the server independent of web-browser technology. In one embodiment, the data representing the user interaction is sent to the server using an advertisement sync gateway (ASG) protocol.

In another embodiment, a protocol server receives the request for promotional material from the user device while the application is active on the user device. The protocol server identifies the promotional material and sends it to the user device in response to the request. The protocol server may identify the promotional material based on a preference from a user profile associated with a user of the user device and stored in a data store of the protocol server. The protocol server may receive data representing a user interaction with the promotional material from the management client on the user device and may store the data representing the user interaction with the promotional material in a data store. The protocol server may analyze the data representing the user interaction to determine an effectiveness of the promotional material.

BRIEF DESCRIPTION OF THE DRAWINGS

The present invention is illustrated by way of example, and not by way of limitation, in the figures of the accompanying drawings.

DETAILED DESCRIPTION

Figure 1:
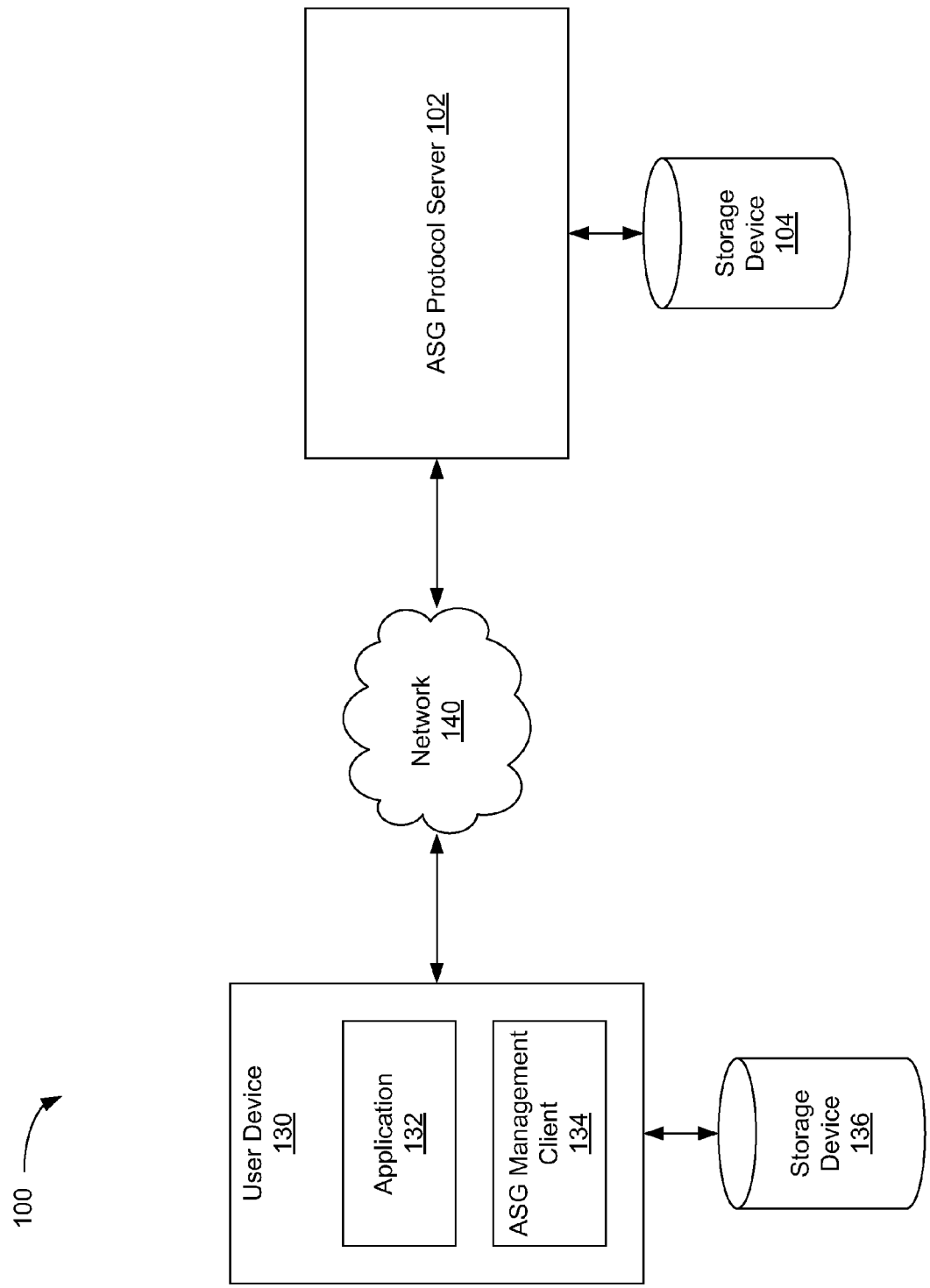
FIG. 1 is a block diagram illustrating an exemplary network architecture in which embodiments of the present invention may be implemented.

Embodiments are described for capturing data for user interaction with promotional materials. This disclosure focuses on the Advertisement Sync Gateway (ASG) protocol which provides for the delivery and tracking of promotional material to ASG enabled user devices, such as smartphones, or other devices. The ASG protocol may provide these capabilities for multiple computer-based platforms independent of web-browser technology. Not having to rely on web-browser technology means that rather than clicking on an advertisement (e.g., a banner ad) and being taken to a separate webpage in a web-browser to view the promotional material, the user may remain in the currently active application without having their progress interrupted. The user may view the promotional material at a later time in a separate management client installed on the user device.

Conceptually, there are three components to the ASG solution described herein. The first component is a client application that resides on a user device such as a smartphone, tablet, etc., which manages the promotional material coming into the device on behalf of the user. This client application may be referred to as the ASG management client. The second component is an ASG protocol server which supports ASG communications to and from ASG enabled client applications via a defined protocol of requests and replies. The ASG protocol server may maintain an internal database used for, but not limited to, storing user identity information, a promotional material catalog, and captured user interaction information via the ASG protocol. In one embodiment, the ASG protocol server resides in the cloud as a cloud based service, meaning that it can be based anywhere and is designed to provide high availability and be scalable to support millions of customers. The third component is the ASG software development kit (SDK), which allows application developers to implement the ASG solution in their own applications in their own flexible way. The ASG SDK may natively support device operating systems and may be designed for ease of use where effort for application integration is low. The ASG SDK may allow developers to create ASG enabled applications, as well as custom versions of the ASG management client.

Delivery of promotional material such as, but not limited to, banner ads, coupons, video ads, etc., can be triggered in a number of different ways. For example, while using an ASG enabled application on a smartphone for weather or news information, a user may receive a non-intrusive coupon (e.g., as a banner ad within the application) and is then briefly notified that a new coupon has been cached or otherwise saved on their smartphone device. At a later time, the user can launch the ASG management client to manage the cached ads and coupons. This provides the user with the option to interact with the promotional material at a later time, thus preventing ASG based ads from being disruptive to the application in progress. The ASG management client allows a user to interact with the cached promotional material, for example, by viewing, saving, sharing, deleting, redeeming, purchasing, etc. Any user interaction with the promotional material in the ASG management client is passed back to the ASG protocol server via the ASG protocol. When the ASG protocol server receives the user interaction information from the ASG management client, the data is captured and recorded in the ASG protocol server's internal database. This information may be further processed and analyzed to determine, for example, the effectiveness of an advertisement campaign.

The ASG protocol has a defined dialog between the ASG protocol server and computer-based clients. This allows the ASG system to capture direct user interaction with promotional material, un-tethered from Internet browser technology. This can provide significant advantages compared to web-based data capture.

Conventional web-based data capture (i.e., using browser technology) is accomplished by tracking user cookies or by inserting site specific tracking code in each webpage of a website. The analytics that are obtained in this tracking methodology are helpful only to understand the efficiency of how well a user interacts with a website, but have no value to an actual digital based advertisement campaign. When an advertiser pays for a digital based banner advertisement campaign, the only data capture available will be limited to how many users clicked on the banner ad and were pushed off to the brand's website. Since the ASG management client caches promotional material onto computer-based clients via a defined protocol, ASG provides additional user interaction capabilities that can be directly captured from the user's device in real time. In one embodiment, this can provide for individualized targeted promotions. For example, if an advertisement campaign has been displaying coupons offering a savings of $2.00 off the purchase of a particular product, ASG may determine that a particular user has never interacted (i.e., viewed, saved, shared, redeemed, purchased) with these offers. The ASG protocol server would then be able to make an advertisement campaign decision for that specific user where it will now start to display coupons offering a savings of $10.00. This allows the advertisement campaign to be dynamically fine tuned to determine user points of interaction, and on an individual basis.

FIG. 1 is a block diagram illustrating an exemplary network architecture in which embodiments of the present invention may be implemented. The network architecture 100 can include one or more servers, such as ASG protocol server 102, communicating with one or more user devices, such as user device 130, over one or more networks, such as network 140, according to one embodiment. One of ordinary skill in the art will appreciate that network 140 may include any network suitable for use in accordance with embodiments of the present invention, including any medium on which electronic data can be transported. Examples of such networks include, but are not limited to, a wide area network (WAN), such as the Internet, a cellular network, a wired network, a wireless network, a local area network (LAN), a 4G network, a 3G network, a 2G network, a satellite network, a digital-subscriber-line (DSL) network, a cable network, a fiber-optic network, and/or any combination of these or other networks.

User device 130 may be any type of computing device that can be variously configured with different features to support data capture for user interaction with promotional materials as described herein. According to embodiments of the present invention, user device 130 may include one or more of a central-processing unit, computer-readable memory, and persistent computer-readable storage. Exemplary computing devices suitable for use in accordance with the present invention include, but are not limited to, cellular devices, mobile smartphones, personal computers, laptop computers, tablet, computers, set-top boxes, electronic book readers, video game consoles, any computing device with network connectivity (e.g., refrigerators connectable to a network, household appliances connectable to a network, televisions connectable to a network), or other similar computing devices.

In one embodiment, user device 130 may be configured to run one or more applications, such as application 132. Application 132 may perform one or more computer implemented functions and may implement the functionality of a video game, email application, chat application, such as a short-message-service (SMS) or multimedia-message-service (MMS) application, productivity application, social media application, or other application. In one embodiment, application 132 may support the distribution of promotional material. Promotional materials may include, but are not limited to, any advertisement, brochure, coupon, multimedia message, loyalty card program, or rebate offering. These promotional materials can exist in multiple formats, which can include, for example, photos, text, audio, video, or any combination of these or other formats. For example, promotional materials may be displayed to a user within application 132 in the form of banner ads, rich media ads, pop-up ads, interstitial ads, etc. Selling and displaying this promotional material may be one form of revenue for the developer of application 132. The promotional material may be displayed in a pictorial or textual format within application 132 and a user of user device 130 may interact with the promotional material (e.g., by "clicking" or otherwise selecting the advertisement).

In one embodiment, user device 130 may also be configured to run ASG management client 134. ASG management client may communicate with application 132 and/or ASG protocol server 102 to determine which promotional materials have been displayed within application 132. In one embodiment, ASG management client 134 maintains a record of these promotional materials and optionally stores a copy of the promotional materials in storage device 136. Storage device 136 may be internal to user device 130 or may be externally connected to user device 130 (as shown in FIG. 1) and may include, for example, one or more mass storage devices, flash memory, magnetic or optical disks, or tape drives, read-only memory (ROM), random-access memory (RAM), erasable programmable memory (e.g., EPROM and EEPROM), or any other type of storage medium. In another embodiment, storage device 136 may be some form of cloud-based storage device, accessible to user device 130 over a network, such as network 140.

ASG management client 134 may also provide an interface to give a user complete management functionally with respect to the promotional materials. For example, through ASG management client 134, a user may be able to view, save, delete, share, purchase, etc. the promotional materials provided in application 132. In addition, ASG management client 134 may provide user credential sign-ups, initiate share requests, manage user preferences with respect to what promotional materials the user wishes to receive, and manage user profile information. Some further examples of the management functionalities provided by ASG management client 134 include a tie-in to location based services for localized promotions, itemized shopping lists with coupon redemption capability, and viewing of video-based promotions, among others. In one embodiment, when new promotional material is received, the user may be briefly notified through application 132 (e.g., by a temporary banner ad or other notification) that the promotional material has been received and cached in storage device 136. The ASG management client 134 allows the user to view and/or interact with the promotional materials at a later time, thus preventing disruption of the application 132 (such as exiting the application, opening a web browser, etc.).

In one embodiment, the promotional materials displayed in application 132 and managed by ASG management client 134 may be provided by ASG protocol server 102. ASG Protocol server 102 can include a network-accessible server-based functionality, various data stores, and/or other data processing equipment. ASG protocol server 102 can be implemented by a single machine or a cluster of machines. In one embodiment, ASG protocol server 102 includes storage device 104. In another embodiment, storage device 104 may be external to ASG protocol server 102 and may be connected to ASG protocol server 102 over a network or other connection. In other embodiments, ASG protocol server 102 can include different and/or additional components which are not shown here so as not to obscure the present invention. Similar to storage device 136, storage device 104 can include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

In one embodiment, ASG protocol server 102 provides the business logic to transmit, receive and execute an ASG protocol with user device 130. The ASG protocol may combine synchronization, user presence, location based services and user identity into one unique protocol dedicated to delivering promotional material to user device 130 and other user devices. The ASG protocol also enables the capture of data relating to user interaction with the promotional material to allow for detailed analysis of the effectiveness of promotional campaigns. ASG protocol server 102 may maintain an internal database on storage device 104, on which user identity information, a catalog of promotional materials, and captured user interaction data are archived via the ASG protocol.

In one embodiment, ASG protocol server 102 may be a cloud-based web service designed to provide high availability and be scalable to support millions of users. One of ordinary skill in the art will appreciate that a web service or cloud-based service may include any software system designed to support interoperable machine-to-machine interaction over a network. A web service may include web application programming interfaces (API) that are accessed over a network, such as network 140 and executed on a remote system hosting the requested service. In addition, one of ordinary skill in the art will appreciate that a number of different protocols may be used to implement the ASG protocol and to transport the electronic data across network 140. Examples of such protocols include, but are not limited to, HTTP, HTTPS, Bluetooth, SNMP, SOAP, and TCP/IP. Additional details of ASG protocol server 102 and the ASG protocol will be described below with respect to FIGS. 2-8.

Figure 2:
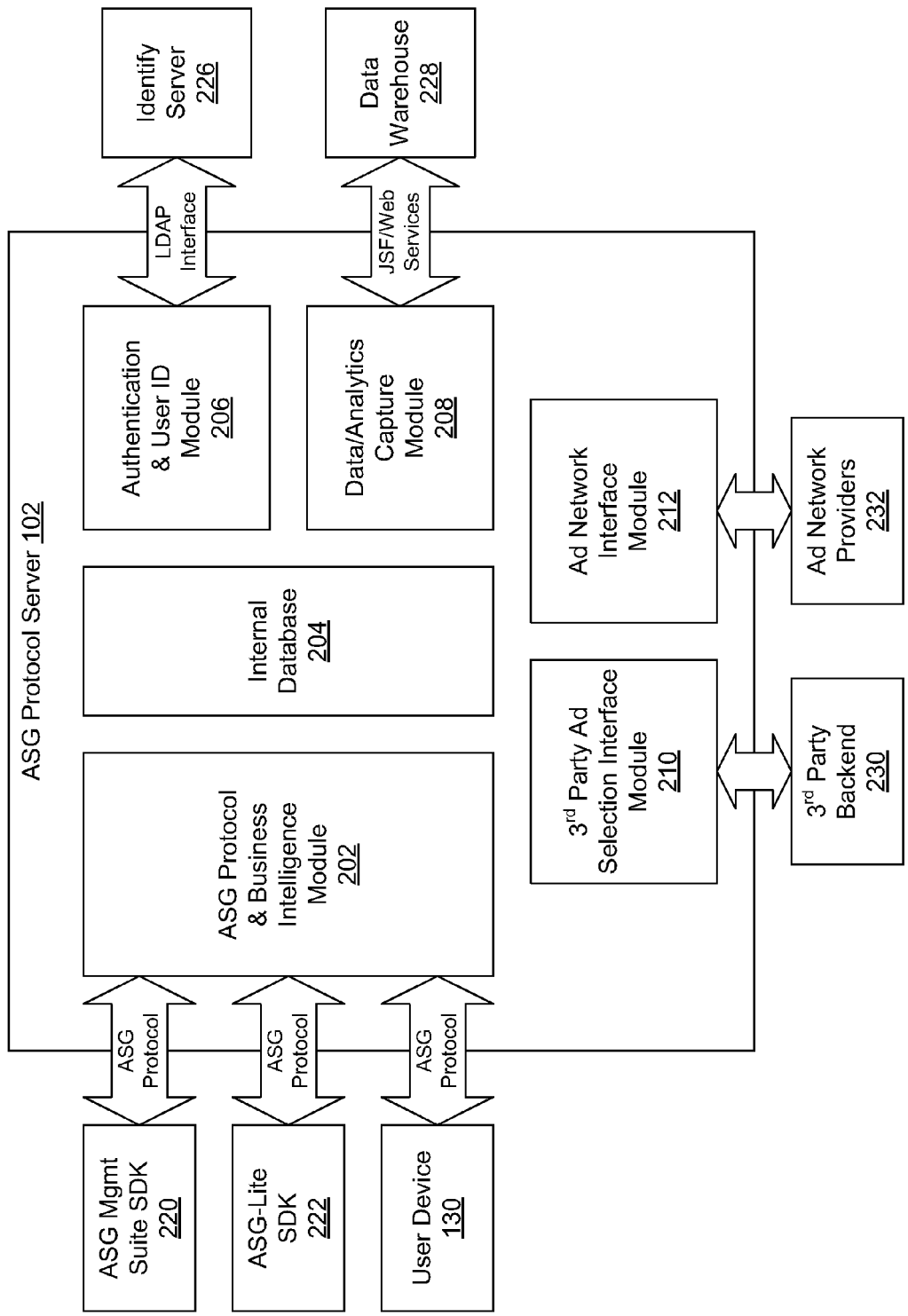
FIG. 2 is a block diagram illustrating an ASG protocol server, according to an embodiment.

FIG. 2 is a block diagram illustrating an ASG protocol server, according to an embodiment of the present invention. In one embodiment, ASG protocol server 102 may include ASG protocol and business intelligence module 202, internal database 204, authentication and user identification module 206, data/analytics capture module 208, third party ad selection interface module 210 and ad network interface module 212. This arrangement of modules may be a logical separation, and in other embodiments, these modules or other components can be combined together or separated into further components, according to a particular embodiment. In one embodiment, internal database 204 may be stored in storage device 104 of FIG. 1. Storage device 104 and internal database 204 may be located within ASG protocol server 102 or externally connected, depending on the embodiment.

ASG protocol and business intelligence module 202 may provide the encoding and decoding of ASG protocol messages sent to and from ASG enabled client applications, such as those on user device 130. ASG protocol and business intelligence module 202 may also enable and control ASG business logic within the ASG protocol server 102 in order to complete the ASG protocol requests and replies. In one embodiment, the ASG protocol utilizes a RESTful web service transport to communicate to and from user devices that have been enabled by either ASG management suite SDK 220 or ASG-lite SDK 222. In other embodiments, some other protocol, such as a protocol based in hyper-text transfer protocol (HTTP) may be used. ASG protocol and business intelligence module 202 may interact with the other supporting modules in ASG protocol sever 102, although those connections may not be shown in FIG. 2.

In one embodiment, ASG protocol and business intelligence module 202 may provide decision tree logic to determine which promotional material will be sent to a user device 130. For example, ASG protocol and business intelligence module 202 may implement an intelligent promotional material selection algorithm to determine what personalized promotional material is to be sent to the user device 130 of a particular user. In one embodiment, the algorithm may identify promotional material based on preferences provided by the user, based on an analysis of the user's interaction with other promotional materials, randomly, pseudo-randomly, or in some other manner. In addition, ASG protocol and business intelligence module 202 may be responsible for aggregating, indexing, archiving, and/or characterizing promotional material content coming from the advertisement feeds, such as third party backend source 230 or ad provider networks 232, and for managing user interaction information recorded in internal database 204.

ASG management suite SDK 220 and ASG-lite SDK 222 may be provided to developers to help them develop ASG enabled applications. The SDKs may simplify development interfacing tasks and enable mobile applications with the ASG protocol to receive and manage promotional material coming from the ASG protocol server. 102. ASG management suite SDK 220 may provide full ASG protocol functionality for an application when ASG advertisement management is desired. Applications programmed with the ASG management suite SDK 220 may provide full control of all advertisement content being cached onto the user device via other ASG enabled applications. For example, a shopping list application requesting coupons based on a user's shopping list content would want to have full control (i.e., display, save, delete, share, purchase, etc.) over all coupons being cached onto the device. In contrast, ASG-lite SDK 222 may provide a simple piece of agent software that application developers can attach to their applications for advertisement enablement. Applications that interface with the ASG-lite SDK 222 libraries can execute a subset of the ASG protocol, whereby promotional material received and cached onto the user device can only be displayed, then managed by a different application, such as ASG management client 134, that has been developed by the ASG management suite SDK 220.

In one embodiment, ASG protocol server 102 maintains internal database 204 to store user profiles which may include the user's advertisement preferences and what advertisement interactions have been associated with a particular user profile. In one embodiment, each module of the ASG protocol server 102 is able to access internal database 204. This access to the database 204 may be provided by the Java Persistence API (JPA) framework providing lightweight, dynamic, and flexible access to persistence storage. Using JPA for storage access provides an agile development framework for new and future ASG functionality and back-end integration. In other embodiments, some other framework may be used. In one embodiment, depending on the configuration, internal database 204 may also be used as a repository for promotional material. For larger deployments, however, internal database 204 may only be used to record what promotional material has been sent to a user from an external source, such as an advertisement network provider 232 or a third party backend advertisement source 230.

Authentication and user identification module 206 may be responsible for maintaining a user identity repository for authentication and user profile access. User credentials may be part of the ASG protocol and may be passed from ASG protocol and business intelligence module 202 to the authentication and user identification module 206 for user validation. Authentication and user identification module 206 may maintain the profile information along with the user's authentication credentials. Via the ASG management client 134, a user has the capability to identify their promotional material preferences (e.g., favorite stores, hobbies, sports, etc.). User preferences may be synchronized to the user's personalized advertisement identity which is managed by authentication and user identification module 206 and may be stored in internal database 204. In one embodiment, authentication and user identification module 206 is designed to interface and federate with other identity services, for example by using the lightweight directory access protocol (LDAP). In this manner, authentication and user identification module 206 may make use of pre-existing user identification information, such as that maintained by a wireless service provider on identity server 226. This prevents the ASG protocol from requiring a separate set of user credentials. In another embodiment, however, ASG protocol may use a separate user identity, rather than relying on other identity services.

Data/analytics capture module 208 may provide the capability to store and retrieve the data representing user interaction with promotional material that is to be used for analytic purposes. Examples of the data captured by data/analytics capture module 208 may include an identifier of the promotional material, the type of user device 130 on which the promotional material was displayed, an identity of the user of user device 130, user preferences, what promotional material has been sent to user device 130 and what promotional material remains on user device 130, user interaction data (e.g., view, save, share, delete, redeem, purchase), user advertisement history, an identifier of the application which requested the promotional material, an identifier of the developer of the application. In one embodiment, data/analytics capture module 208 may support one or more interfaces for data extraction (e.g., to data warehouse 228). The interfaces may include, for example, JavaServer Faces (JSF) for web-based access, a web service for interprocess communication of analytic data, and/or other interfaces.

ASG protocol server 102 may be designed to handle multiple advertisement feeds from different sources, such as third party backend source 230 or advertisement network providers 232. Promotional material can exist in multiple forms, known as "assets," such as text, images, videos, and other media types. These assets may be indexed and stored in a database. Promotional materials may be cataloged with an individual identification number along with an ASG promotional material bit-map code to characterize (or profile) the promotional material into categories, based on medium, targeted gender, targeted age range, category (e.g., sports, entertainment, business) or others. In one embodiment, third party ad selection interface module 210 may interface with third party backend source 230 to receive promotional materials to be provided to user devices by ASG protocol server 102. Similarly, ad network interface module 212 may interface with ad network providers 232.

Figure 3:
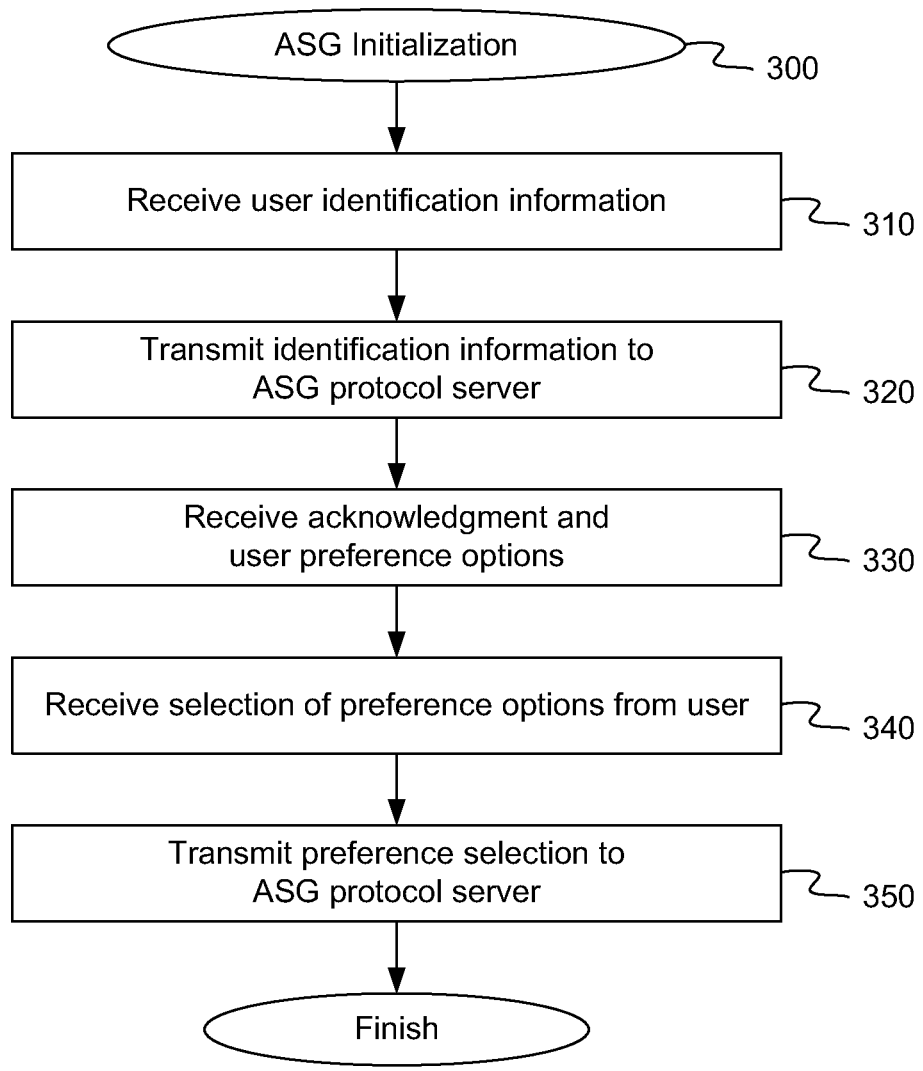
FIG. 3 is a flow diagram illustrating a method for user initialization of the ASG protocol, according to an embodiment.

FIG. 3 is a flow diagram illustrating a method for user initialization of the ASG protocol according to an embodiment of the present invention. The method 300 may be performed by processing logic that comprises hardware (e.g., circuitry, dedicated logic, programmable logic, microcode, etc.), software (e.g., instructions run on a processing device to perform hardware simulation), or a combination thereof. The method 300 can initialize user settings for the ASG protocol to provide for data capture for user interaction with promotional material. In one embodiment, method 300 may be performed by ASG management client 134 as shown in FIG. 1, in connection with ASG protocol server 102 as shown in FIG. 2.

ASG management client 134 may be a stand-alone application running on user device 130. As discussed above, ASG management client 134 may be developed directly by the user using ASG management suite SDK 220. In other embodiments, ASG management client 134 may come pre-installed on user device 130, for example as part of a suite of application provided by a wireless service provider, or may be downloaded onto user device 130 by the user. ASG management client 134 may be configured to interface with an ASG enabled application, such as application 132, also installed on user device 130.

Upon using ASG management client 134 for the first time, ASG management client 134 may guide a user through an initialization process. Referring to FIG. 3, at block 310, method 300 may receive user identification information from the user. ASG management client 134 may prompt the user to provide the identification information and/or any associated access credentials. In one embodiment, the identification information may be shared with another application or web-service (e.g., as part of a single-sign-on solution). In other embodiments, the identification information may be specific to the ASG management client 134 and may be provided, for example, by the wireless service provider. At block 320, method 300 may transmit the received identification information to protocol server 102. Using a series of defined ASG protocol messages, ASG management client 134 may transmit the information to ASG protocol server 102 over network 140. ASG protocol and business intelligence module 202 may receive the message and pass the contents to authentication and user identification module 206. Authentication and user identification module 206 may create a user profile based on the identification information, if one does not already exist, and store it, for example in internal database 204.

At block 330, method 300 may receive an acknowledgement for the ASG protocol request. ASG management client 134 may receive an acknowledgement message from ASG protocol server 102 indicating that the identification information was successfully received. The acknowledgement may additionally include a number of user preference options for the user of user device 130. The user preference options may include a number of selectable options regarding the types of promotional material that the user is interested in receiving. These types may be organized in categories, such as sports, games, product types, etc. At block 340, method 300 receives a selection of the preference options from the user. The user may input these selections through an interface provided by ASG management client 134. In the event that the user does not make a selection or indicate any preferences, a default or random set of preferences may be automatically selected for the user.

At block 350, method 300 transmits the user's preference selections to the ASG protocol server 102. These selections may be similarly transported over network 140 using ASG protocol messages. ASG protocol and business intelligence module 202 may receive the message and add the user preferences to the user profile created above in internal database 204.

Figure 4:
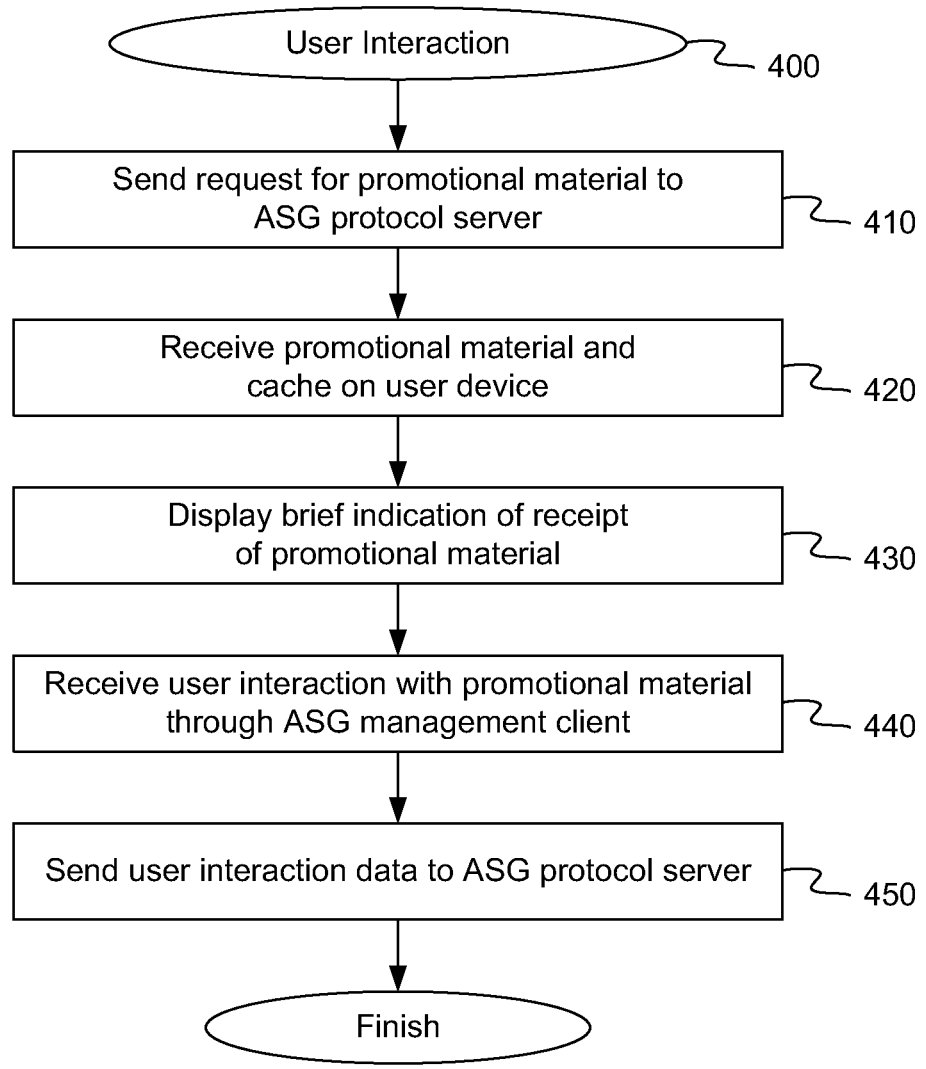
FIG. 4 is a flow diagram illustrating a method for user interaction with promotional material based on the ASG protocol, according to an embodiment.

FIG. 4 is a flow diagram illustrating a method for user interaction with promotional material based on the ASG protocol according to an embodiment of the present invention. The method 400 may be performed by processing logic that comprises hardware (e.g., circuitry, dedicated logic, programmable logic, microcode, etc.), software (e.g., instructions run on a processing device to perform hardware simulation), or a combination thereof. The method 400 can process user interaction with promotional material and provide data on that interaction to an ASG protocol server. In one embodiment, method 400 may be performed by application 132 and/or ASG management client 134 as shown in FIG. 1, in connection with ASG protocol server 102 as shown in FIG. 2.

Referring to FIG. 4, at block 410, method 400 sends a request for promotional material to ASG protocol server 102. As a user is accessing an ASG enabled application 132 on user device 130, the application code may be designed to request that promotional material may be provided to the user. In one embodiment, application 132 may have been developed using ASG-lite SDK 222 and may make a request (e.g., an API call) for promotional material using the ASG protocol. In one embodiment, ASG management client 134 may interface with application 132 to receive the request from application 132 for promotional material. ASG management client 134 may forward the request to ASG protocol server 102 over network 140. In another embodiment, application 132 may transmit the request for promotional material directly to ASG protocol server 102 while application 132 is active.

At block 420, method 400 receives promotional material and caches it on the user device 130. In response to the request sent at block 410, ASG protocol server 102 may identify promotional material and transmit it to user device 130 using the ASG protocol. Depending on the requestor, application 132 or ASG management client 134 may receive the promotional material and store it in storage device 136. In one embodiment, application 132 may store the promotional material in a cache memory, so that it may be retrieved by ASG management client 134 faster at a later time.

At block 430, method 400 displays a brief indication of receipt of the promotional material. In one embodiment, application 132 may display a message to the user indicating that the promotional material was received, cached in storage device 136 and is available for interaction via ASG management client 134. In another embodiment, ASG management client 134 may receive the promotional material and pass a message to application 132 indicating that the promotional material was received. In certain embodiments, the indication may be visual, such as a banner ad or pop-up message, audible, such as a tone or beep, or in some other format.

Figure 5A:
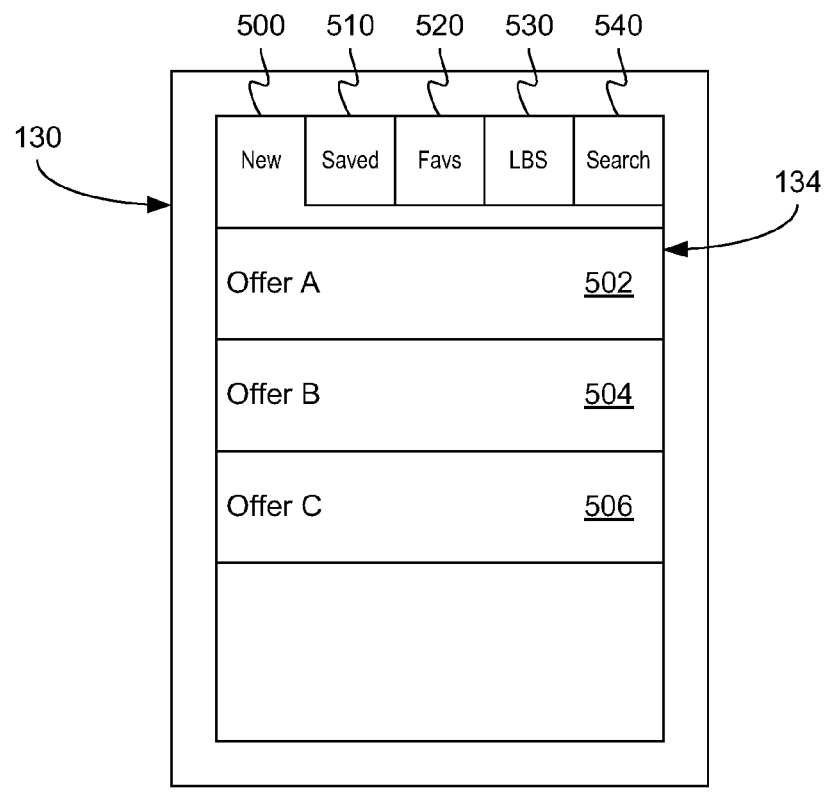
FIGS. 5A and 5B are block diagrams illustrating interfaces provided by an ASG management client for user interaction, according to embodiments.

At block 440, method 400 receives a user interaction for promotional material. In one embodiment, a user may access the stored promotional material through an interface provided by ASG management client 134. One example of such an interface is illustrated in FIG. 5A. FIG. 5A is a block diagram illustrating an ASG management client interface 134 displayed on user device 130. In this embodiment, ASG management client 134 includes a number of user selectable tabs including "New" tab 500, "Saved" tab 510, "Favorites" tab 520, "Location Based Services (LBS)" tab 530 and "Search" tab 540. In one embodiment, each tab 500-540 may include a display area for displaying one or more associated promotional materials. For example, "New" tab 500 may included newly received promotional materials, such as Offer A 502, Offer B 504 and Offer C 506. As discussed above, these promotional materials may have many forms, such as but not limited to, advertisements, brochures, coupons, multimedia messages, loyalty card programs, and rebate offerings.

In other embodiments, "Saved" tab 510 may include promotional materials that were previously viewed and the user elected to save. "Favorites" tab 520 may include promotional materials from the user's favorite brands or retailers. "LBS" tab 530, may include promotional materials based on the users current location. For example, if user device is enabled with Global Positioning System (GPS) technology, ASG protocol server 102 may be able to determine the location of user device 130 and identify offers from retailers that are within a given proximity. These offers may be displayed under the "LBS" tab 530. "Search" tab 540 may include a search interface to allow the user to search for previously received offers or for new offers (e.g., by title or keyword).

Figure 5B:
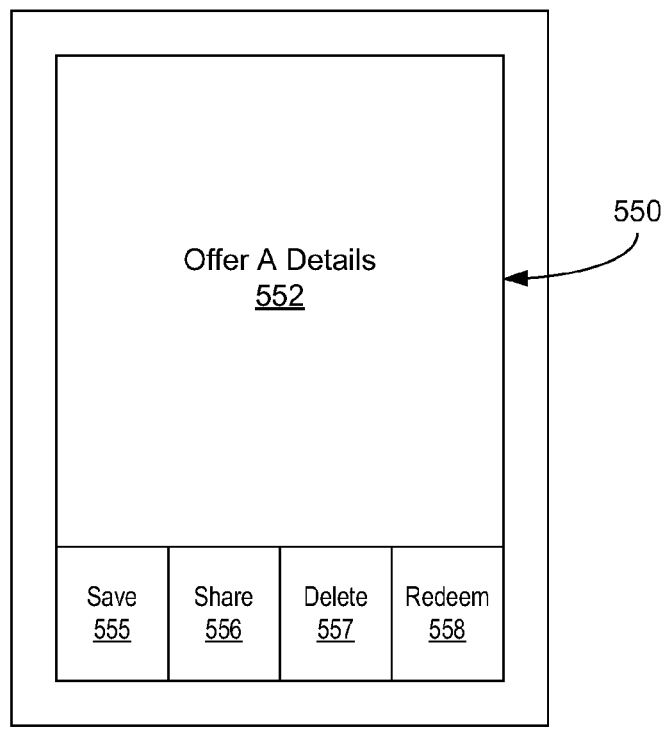

In one embodiment, a user may be able to select one of the displayed promotional materials (e.g., Offer A 502) from ASG management client 134. In response to the selection, ASG management client 134 may display another interface, such as the one shown in FIG. 5B. FIG. 5B is a diagram illustrating a promotional material detail interface 550 for receiving user interaction with the promotional material. In one embodiment, the interface 550 includes details 552 of the selected offer (e.g., Offer A 502). For example, the details section 552 may include a visual advertisement such as text or a photograph, a multimedia message, such as a video or audio presentation, printable or scanable coupon, or other form of promotional material. The interface 550 may additionally include one or more interaction controls, such as for example, "Save" 555, "Share" 556, "Delete" 557 and "Redeem" 558. The user may select one of these controls 555-558 to cause ASG management client 134 to take a corresponding action with respect to the promotional material.

Referring again to FIG. 4, at block 440, ASG management client 134 may receive user interaction (e.g., through selection of one of controls 555-558). At block 450, method 400 may send user interaction data to ASG protocol server 102. ASG management client may send an ASG protocol message including an indication of what interactions the user performed for a given promotional material. ASG protocol server 102 may store this data, as will be described below.

Figure 6:
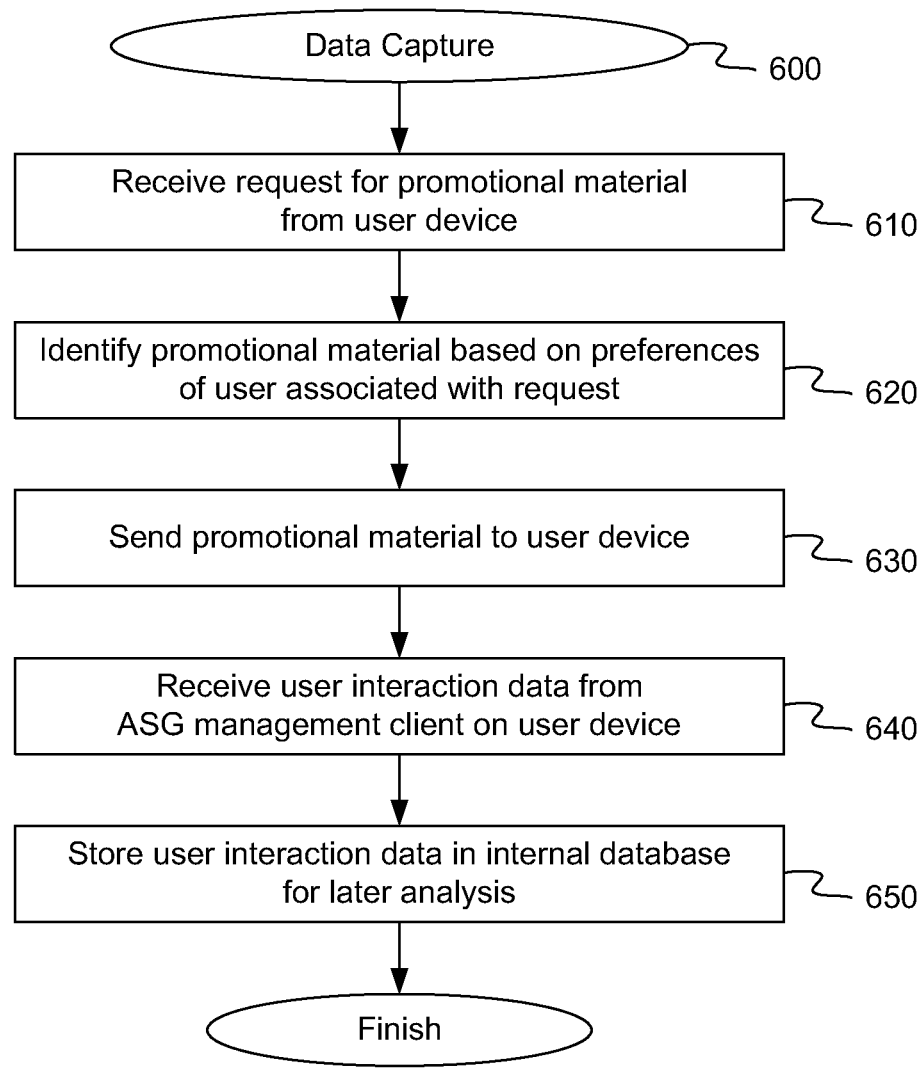
FIG. 6 is a flow diagram illustrating a method for data capture for user interaction with promotional material based on the ASG protocol, according to an embodiment.

FIG. 6 is a flow diagram illustrating a method for data capture for user interaction with promotional material based on the ASG protocol according to an embodiment of the present invention. The method 600 may be performed by processing logic that comprises hardware (e.g., circuitry, dedicated logic, programmable logic, microcode, etc.), software (e.g., instructions run on a processing device to perform hardware simulation), or a combination thereof. The method 600 can capture data for user interaction with promotional material and save the user interaction data for later analysis and processing. In one embodiment, method 600 may be performed by ASG protocol server 102 as shown in FIG. 2, in connection with application 132 and/or ASG management client 134 as shown in FIG. 1.

Referring to FIG. 6, at block 610, method 600 receives a request for promotional material from user device 130. The request may include an ASG protocol request sent by either application 132 or by ASG management client 134 while application 132 is active. In one embodiment, the ASG protocol request may include various pieces of data related to the request. For example, the ASG protocol request may include data such as, an identifier of user device 130, an identity of the user making the request, an identifier of the application 132, a time stamp, a location identifier, and/or additional data. The request may be received by ASG protocol and business intelligence module 202 of ASG protocol server 102.

At block 620, method 600 identifies promotional materials to provide to user device 130 based on preferences of the user associated with the request. In one embodiment, ASG protocol and business intelligence module 202 may query internal database 204 for profile information based on the user identifier contained in the received ASG protocol request. As discussed above, the user profile may have been generated in internal database 204 by authentication and user identification module 206 when the user first registered with ASG. The user profile may contain user preferences pertaining to the types of promotional material the user would prefer to receive. ASG protocol and business intelligence module may select a promotional material to provide to user device 130, for example, according to a predefined formula or algorithm. The formula may take into account various factors, such as for example, the user preferences in the user profile, the location of the user device 130 when the ASG protocol request was received, the results of previous user interactions with other promotional materials (which may be stored in the profile in internal database 204) or other factors. The promotional material selected by ASG protocol and business intelligence module 202 may be obtained by third party advertisement selection interface module 210 or advertisement network interface module 212 from third party backend source 230 or advertisement network provider 232, respectively.

At block 630, method 600 may send the promotional material to user device 130. ASG protocol and business intelligence module 202 may transfer the promotional material to application 132 and/or ASG management client 134 in user device 130. Application 132 and/or ASG management client 134 may store the received promotional material, for example, in storage device 136. ASG management client 134 may receive user interaction with the promotional material through an interface, as described above.

At block 640, method 600 may receive user interaction data from ASG management client 134 on user device 130. The user interaction data may be representative of an interaction that the user had with the promotional material through the interface 550 of ASG management client 134. The user interaction data may be sent by ASG management client 134 to ASG protocol and business intelligence module 202 of ASG protocol server 102 in an ASG protocol message. In one embodiment, the ASG protocol message may include information similar to that included with the ASG protocol request sent at block 610, such as an identifier of user device 130, an identity of the user, an identifier of the application 132, a time stamp, or a location identifier. In addition, the ASG protocol message may include the user interaction data such as whether the user viewed, saved, shared, redeemed, purchased or deleted the promotional material. In one embodiment, there may be one ASG protocol message for each individual user interaction. In other embodiments, multiple user interactions with one or more different promotional materials may be combined into a single ASG protocol message.

Figure 7:
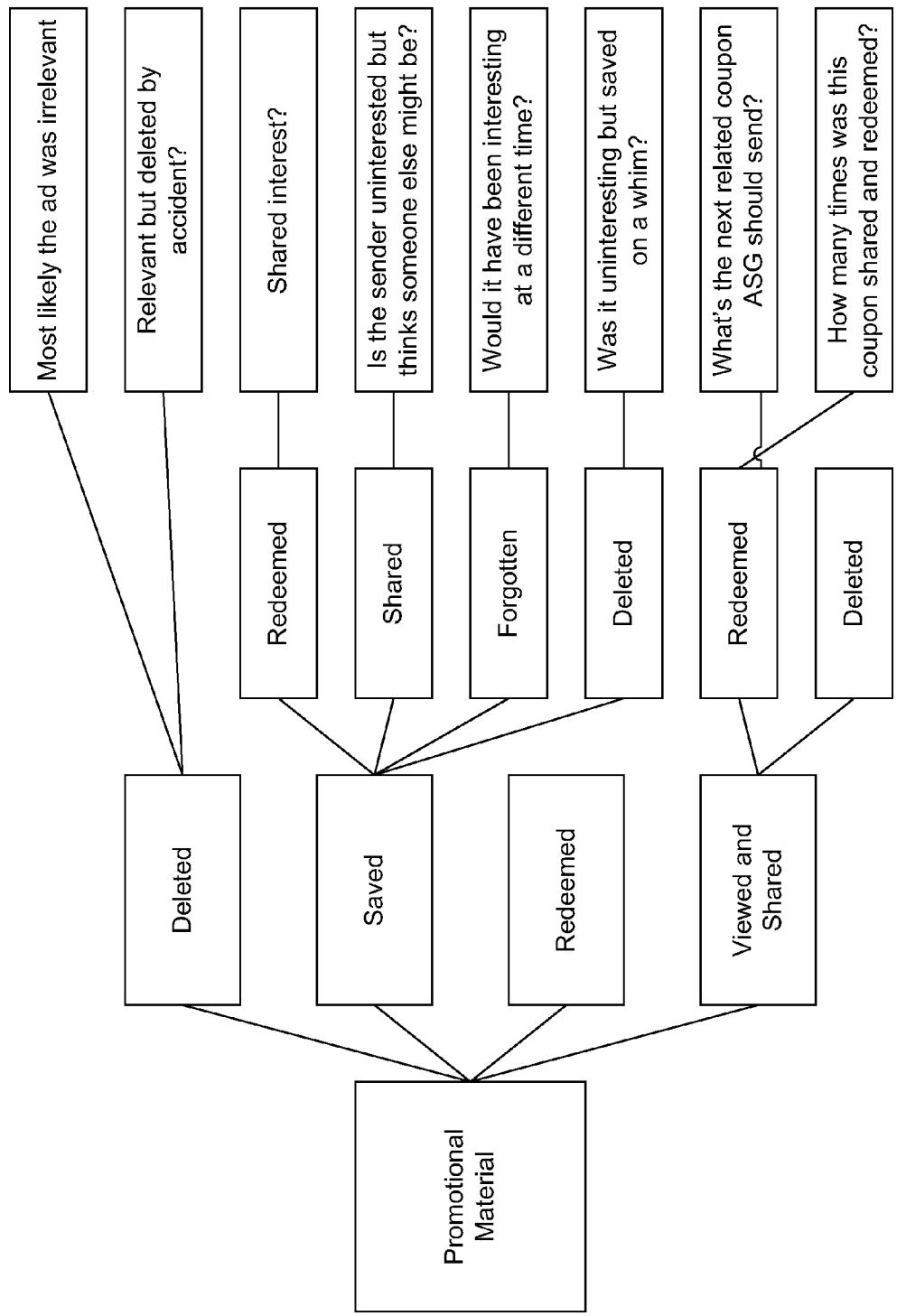
FIG. 7 is a diagram illustrating an analysis that may be performed based on captured user interaction data, according to an embodiment.

At block 650, method 600 stores the received user interaction data in internal database 204 for later analysis. ASG protocol and business intelligence module 202 may store the user interaction data in the user profile of internal database 204. In another embodiment, internal database 204 may be organized based on specific promotional materials, and the user interaction data may be stored in an entry corresponding to the promotional material with which the user interacted. At this or a later time, data/analytics capture module 208 may interface with internal database to retrieve the stored user interaction data. Data/analytics capture module 208 may perform an analysis on the user interaction data or may export the data, for example to data warehouse 228, for analysis by some other system. One example of the analysis that may be performed by data/analytics capture module 208 based on the user interaction data is illustrated in FIG. 7.

Figure 8:
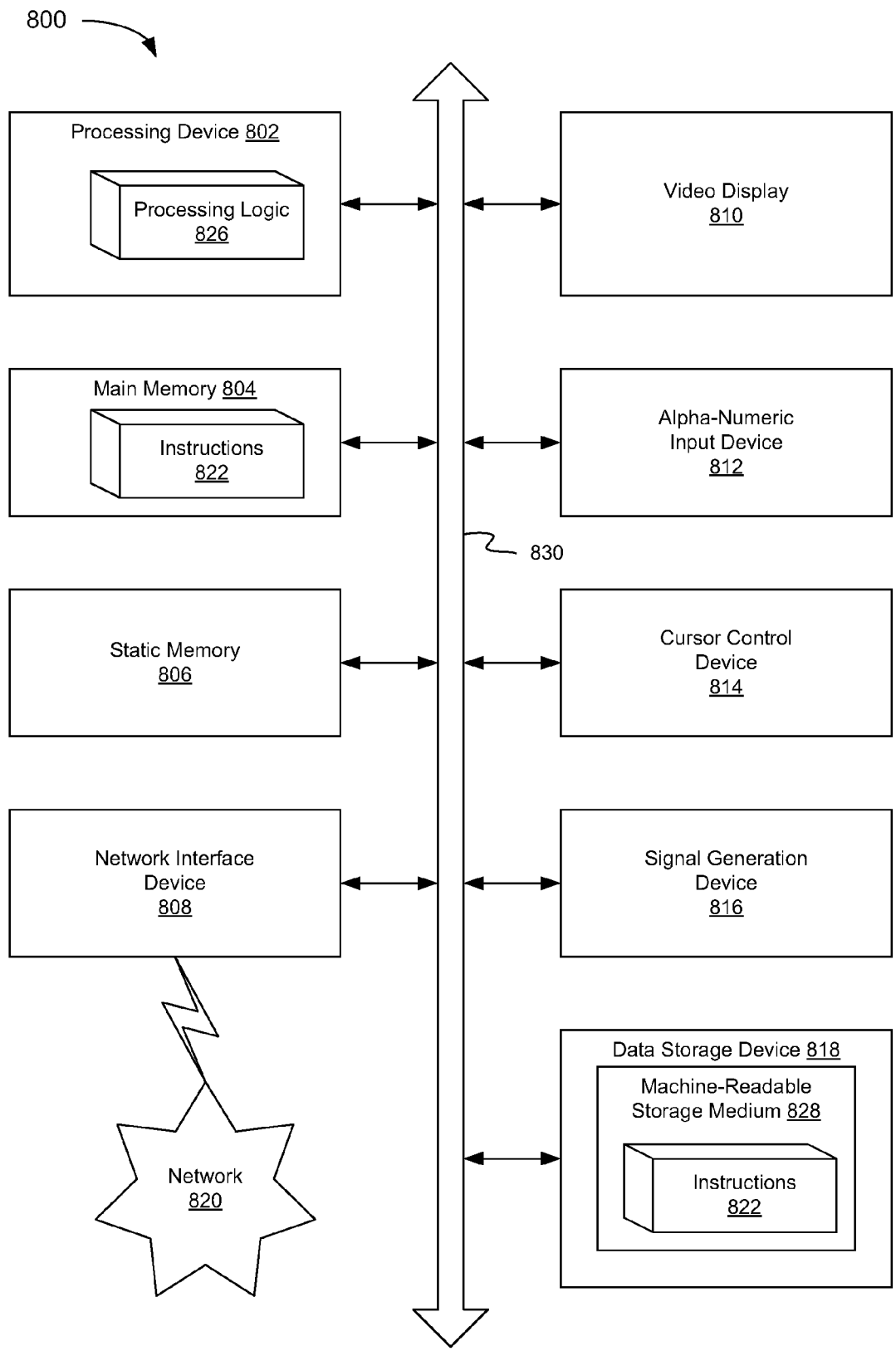
FIG. 8 is a block diagram illustrating one embodiment of a computer system, according to an embodiment.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a user device, such as user device 130, or of a server, such as ASG protocol server 102.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium 828, on which is stored one or more set of instructions 822 (e.g., software) embodying any one or more of the methodologies of functions described herein. The instructions 822 may also reside, completely or at least partially, within the main memory 804 and/or within the processing device 802 during execution thereof by the computer system 800; the main memory 804 and the processing device 802 also constituting machine-readable storage media. The instructions 822 may further be transmitted or received over a network 820 via the network interface device 808.

The machine-readable storage medium 828 may also be used to store instructions to perform a method for data capture of user interaction with promotional material, as described herein. While the machine-readable storage medium 828 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method of capturing, by a management client running on a user device, data corresponding to user interaction with promotional material on the user device, the method comprising:
    receiving, by a processing device, a request for the promotional material from a non-web-browser application on the user device;
    sending, by the processing device, the request for promotional material to a web service comprising a server while the application is active on the user device;
    receiving, by the processing device, the promotional material from the web service at a first time;
    storing, by the processing device, the promotional material in a data store on a user device;
    launching, by the processing device, the management client on the user device for access to the promotional material in response to a request from a user of the user device;
    presenting, by the processing device, the promotional material for user interaction, wherein the promotional material is presented by the management client outside the application at a second time, wherein the second time is later than the first time;
    receiving, by the processing device, a user interaction with the promotional material;
    generating, by the processing device, data representing the user interaction with the promotional material in the management client; and
    transmitting, by the processing device and over a wireless communication network, the data representing the user interaction to the web service,
    wherein the server is configured to analyze the data representing the user interaction to determine an effectiveness of the promotional material.

2. The method of claim 1, wherein the management client comprises a second application running on the user device and is separate from the application.

3. The method of claim 2, wherein the management client is configured to manage a plurality of promotional materials received from the server and to provide access to the promotional materials without interrupting a function of the application.

4. The method of claim 1, wherein the promotional material comprises at least one of an advertisement, brochure, coupon, multimedia message, loyalty card program, or rebate offering.

5. The method of claim 1, wherein the user interaction comprises at least one of viewing, saving, sharing, deleting, purchasing or redeeming the promotional material.

6. The method of claim 1, wherein the data representing the user interaction is sent to the server using an advertisement sync gateway (ASG) protocol, the ASG protocol comprising a communication scheme to deliver the promotional material from the server to a plurality of user devices and enable capture of the data representing the user interaction from the plurality of user devices.

7. The method of claim 1, further comprising:
    storing a copy of the data representing the user interaction with the promotional material in the management client on the user device.

8. A user device running a management client to capture data corresponding to user interaction with promotional material on the user device, the user device comprising:
    a memory; and
    a processing device operatively coupled to the memory, the processing device to:
        receive a request for the promotional material from a non-web-browser application on the user device;
        send the request for promotional material to a web service comprising a server while the application is active on the user device;
        receive the promotional material from the web service at a first time;
        store the promotional material in the memory;
        launch the management client on the user device for access to the promotional material in response to a request from a user of the user device;
        present the promotional material for user interaction, wherein the promotional material is presented by the management client outside the application at a second time, wherein the second time is later than the first time;
        receive a user interaction with the promotional material; and
        transmit, over a wireless communication network, data representing the user interaction to the web service, wherein the server is configured to analyze the data representing the user interaction to determine an effectiveness of the promotional material.

9. The user device of claim 8, wherein the management client comprises a second application running on the user device and is separate from the application.

10. The user device of claim 9, wherein the management client is configured to manage a plurality of promotional materials received from the server and to provide access to the promotional materials without interrupting a function of the application.

11. The user device of claim 8, wherein the promotional material comprises at least one of an advertisement, brochure, coupon, multimedia message, loyalty card program, or rebate offering.

12. The user device of claim 8, wherein the user interaction comprises at least one of viewing, saving, sharing, deleting, purchasing or redeeming the promotional material.

13. The user device of claim 8, wherein the data representing the user interaction is sent to the server using an advertisement sync gateway (ASG) protocol, the ASG protocol comprising a communication scheme to deliver the promotional material from the server to a plurality of user devices and enable capture of the data representing the user interaction from the plurality of user devices.

14. The user device of claim 8, the application further to: store a copy of the data representing the user interaction on the user device.

15. A non-transitory machine-readable storage medium storing instructions which, when executed, cause a processing device to:
receive a request for the promotional material from a non-web-browser application on the user device;
send the request for promotional material to a web service comprising a server while the application is active on the user device;
receive the promotional material from the web service at a first time;
store the promotional material in the memory;
launch a management client on the user device for access to the promotional material in response to a request from a user of the user device;
present the promotional material for user interaction, wherein the promotional material is presented by the management client outside the application at a second time, wherein the second time is later than the first time;
receive a user interaction with the promotional material; and
transmit, over a wireless communication network, data representing the user interaction to the web service, wherein the server is configured to analyze the data representing the user interaction to determine an effectiveness of the promotional material.

16. The non-transitory machine-readable storage medium of claim 15, wherein the management client comprises a second application running on the user device and is separate from the application.

17. The non-transitory machine-readable storage medium of claim 16, wherein the management client is configured to manage a plurality of promotional materials received from the server and to provide access to the promotional materials without interrupting a function of the application.

18. The non-transitory machine-readable storage medium of claim 15, wherein the promotional material comprises at least one of an advertisement, brochure, coupon, multimedia message, loyalty card program, or rebate offering.

19. The non-transitory machine-readable storage medium of claim 15, wherein the user interaction comprises at least one of viewing, saving, sharing, deleting, purchasing or redeeming the promotional material.

20. The non-transitory machine-readable storage medium of claim 15, wherein the data representing the user interaction is sent to the server using an advertisement sync gateway (ASG) protocol, the ASG protocol comprising a communication scheme to deliver the promotional material from the server to a plurality of user devices and enable capture of the data representing the user interaction from the plurality of user devices.

* * * * *